United States Patent Office 3,533,730
Patented Oct. 13, 1970

3,533,730
2-IMIDO-COUMARIN DYESTUFF PREPARATIONS AND METHODS OF DYEING AND PRINTING SYNTHETIC FIBERS THEREWITH
Jacques Voltz, Riehen, Tibor Somlo, Birsfelden, Basel-Land, and Heinrich Hausermann, Riehen, Switzerland, assignors to J. R. Geigy A.G., Basel, Switzerland
No Drawing. Filed Feb. 14, 1967, Ser. No. 615,912
Claims priority, application Switzerland, Feb. 17, 1966, 2,438/66
Int. Cl. D06p 5/04
U.S. Cl. 8—173
19 Claims

ABSTRACT OF THE DISCLOSURE

Dye compositions containing an effectively colouring amount of water dispersible dyestuff free from water-solubilising groups dissociating acid in water, which dyestuffs are of the formula

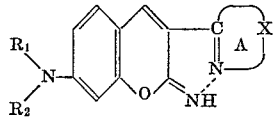

wherein

X represents a divalent radical which makes up the nitrogen-containing ring A into a five or six membered ring of aromatic character, and
each of $R_1$ and $R_2$ represents hydrogen, an optionally substituted alkyl group or a cycloalkyl group, or
$R_1$ and $R_2$ together with the nitrogen atom to which they are linked, optionally with the inclusion of another hetero atom, can represent a hetero ring, and dispersing and optionally diluting agent compatible therewith; methods of dyeing and printing organic synthetic fibre materials, especially polyethylene glycol terephthalate, cellulose ester, synthetic polyamide and acrylic fibres, dyed with the aforesaid dyestuff preparations; and the aforesaid organic fibres dyed therewith.

---

This invention relates to certain novel dye compositions containing as colouring ingredient, 7-amino-2-imido-coumarin derivatives, methods for the dyeing and printing of synthetic fibre materials with said coumarin derivatives and compositions containing them, and, as industrial products, synthetic fibre materials dyed and printed according to the aforesaid methods and having a content of the novel dyestuffs.

2 - imido-3 - benzimidoazolyl-(2) - coumarin is known from Swiss Pat. 372,307 to be of inferior stability and to readily cleave off ammonia in an aqueous medium. Hitherto, 7-amino-substituted derivatives thereof, such as the 7-diethylamino analog, and other similar compounds in which the 3-position of the coumarin ring is substituted by the radical

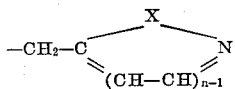

wherein X represents a divalent radical which completes an unsaturated five- to six-membered ring and $n$ represents a positive integer of at most 2, have not been isolated. Indeed, it was believed that, similar to the aforesaid 7-unsubstituted benzimidazolyl coumarins such 7-substituted compounds could only be of inferior stability and hence be unsuited as dyestuffs affording dyeings of satisfactory fastness properties.

For this reason, only the corresponding 2-ketocoumarins have been produced which are, indeed, very satisfactory dyestuffs as described in U.S. Pat. 3,014,041.

It has now been found that, unexpectedly, those 2-imido coumarins which bear in 3-position at the coumarin nucleus a five or six-membered aromatic heterocyclic radical linked to the said position by one of its carbon atoms and having the latter linked by a double bond directly to a nitrogen atom as hetero ring member, and which contain simultaneously in 7-position at the coumarin nucleus an unsubstituted or substituted amino group, are so stable against hydrolysis that, unexpectedly, they can be readily produced at room temperature by a process described in detail further below and that they constitute useful dyestuffs for the dyeing and printing of synthetic organic fibre materials and, in particular, have marked affinity in aqueous dispersion to textiles made from polyesters or synthetic polyamides.

That dye compositions according to the invention containing the last mentioned 7-amino coumarin imide derivatives are suitable as dyestuffs for the dyeing and printing of the synthetic fibre materials mentioned and, in particular, have marked affinity in aqueous dispersion to textiles made from polyesters of synthetic polyamides, could not have been foreseen as it is known that coumarin imide compounds are instable and, in aqueous boiling media, generally are saponified to the corresponding coumarin compounds.

Of the great number of yellow dispersion dyestuffs for synthetic fibre materials, up to the present only a few fluorescent yellow dispersion dyestuffs, e.g., derivatives of naphthoperinone, could be used technically. Such dispersion dyestuffs, however, have great disadvantages such as bad drawing power, weak colour, strength and insufficient fastness to washing, sublimation and light. The dyestuffs usable according to the invention are surprisingly free to a great extent from these disadvantages. They are distinguished by greenish yellow, yellow and reddish yellow shades of extreme vividness and fluorescence, great colour strength and, therefore, great economy in use, also by their good drawing power and great fastness to sublimation. Even on closely woven fabrics or tightly twisted yarns, good and evenly penetrated dyeings are obtained therewith. The dyeings have very good fastness to milling, solvents and cross-dyeing. In addition they have excellent fastness properties in use such as, in particular, very good fastness to light, washing, rubbing, perspiration and industrial fumes. These dyestuffs also possess the valuable property of preserving cotton and wool to a great extent which is of great technical importance in the dyeing of mixed fabrics. Because of the very good fastness to sublimation of these dyestuffs, they can be mixed very well with other dispersion dyestuffs having this property for the dyeing of fibre materials by the pad dyeing/thermo fixing process.

More in particular, the invention, therefore, provides, in a first aspect, novel dye compositions containing an effectively colouring amount of 7-amino-2-imido-coumarin dyestuff free from water-solubilising groups which dissociate acid in water, and being of the formula

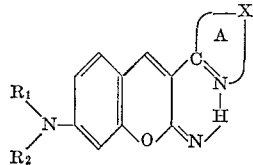

wherein

X—represents a divalent radical which makes up the nitrogen containing ring A into a five or six membered aromatic azole or azine ring optionally fused with a preferably mono- or di-carbocyclic aromatic radical, each of $R_1$ and $R_2$ represents independently of the other, hydrogen, an unsubstituted alkyl group or an alkyl group substituted as defined below by substituents not dissociating acid in water, "alkyl" in both cases having preferably not more than 6 carbon atoms, or a cycloalkyl group preferably of 5–6 carbon atoms, or, alternatively, $R_1$ and $R_2$ together with the nitrogen atom to which they are linked, with the optional inclusion of a further hetero, especially a nitrogen, oxygen or sulphur, atom, can form a hetero ring, which ring is preferably five or six-membered.

As defined above, the ring A is either a five-membered aromatic azole ring, which means that there must be at least two and up to four hetero atoms present in the ring one of which is the nitrogen atom shown in the formula of that ring, the other hetero atom or atoms being nitrogen, sulphur or oxygen, or A is a six-membered aromatic azine ring, or a five- or six-membered ring as defined above fused with a carbocyclic-aromatic preferably mono- or dicyclic radical, e.g., with a naphthalene ring or, preferably, with a benzene ring.

If the nitrogen-containing heterocycle A is an azole ring as defined above, then the divalent radical X according to the above Formula I making up this ring represents, e.g., the vinylamino radical —CH=CH—NH—, the vinylthio radical —CH=CH—S—, the vinyloxy radical —CH=N—NH—, —N=CH—O— or —N=CH—S— cal —CH=CH—O— or the radicals When it has these meanings, X makes up a pyrazole or imidazole, thiazole, oxazole, 1,2,4-triazole, 1,3,4-oxdiazole or 1,3,4-thiadiazole ring. If X represents a divalent

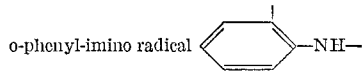

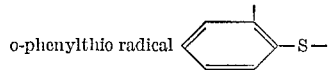

or

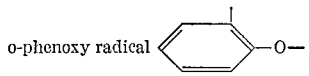

then the hetero ring is a benzimidazole, benzothiazole or benzoxazole ring.

If the nitrogen-containing heterocycle A is an azine ring, then the divalent radical X forming part thereof according to Formula I above represents, e.g., the butadienylene radical —CH=CH—CH=CH—, the styrylene radical bound in the o-position to the vinylene group

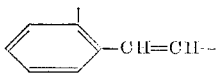

or the propenyl-imino radical —CH=CH—CH=N—. In these meanings, X forms part of a pyridine, quinoline or pyrimidine ring bound in the 2-position to the coumarin imide radical.

The carbocyclic-aromatic rings fused to the nitrogen-containing ring A, particularly the benzene ring, can be further substituted by groups which do not dissociate acid in water and are not water-solubilising. Such ring substituents are, more in particular, halogen, especially chlorine and bromine; lower alkyl groups preferably methyl; trifluoromethyl; lower alkoxy groups, e.g., methoxy or ethoxy; lower alkyl-sulphonyl groups, especially methylsulphonyl and ethylsulphonyl; carboxylic acid ester groups, especially lower alkoxy carbonyl groups such as methoxy-carbonyl and ethoxy-carbonyl; and a benzyloxy carbonyl group; furthermore, the carbamoyl group and N-monosubstituted or N,N-disubstituted carbamoyl groups, particularly N-lower alkyl-carbamoyl or N,N-di-lower alkyl carbamoyl groups; and finally, acylamino groups, e.g., lower alkanoylamino groups such as the acetylamino group or lower alkylsulphonylamino groups such as the methylsulphonylamino group.

Substituents of alkyl radicals represented by $R_1$ and/or $R_2$ are in particular halogens such as chlorine or bromine; the cyano group; the hydroxyl group; ether groups, particularly lower alkoxy groups; acyloxy groups, preferably lower alkanoyloxy groups; or aryl groups, particularly the phenyl group. In this case $R_1$ and/or $R_2$ represents, e.g., the β-chlorethyl or β-bromethyl, β-cyanoethyl, β-hydroxyethyl, β- or γ-hydroxypropyl, β,γ-dihydroxypropyl, β-methoxyethyl or β-ethoxyethyl, γ-methoxypropyl or γ-ethoxypropyl, β-acetoxyethyl or β-propionyloxyethyl, or the benzyl group. When $R_1$ and $R_2$ represent a cycloalkyl group this is preferably the cyclohexyl group. If $R_1$ and $R_2$ together with the nitrogen atom to which they are linked form a hetero ring, then this is, e.g., the pyrrolidine or piperidine ring and, if this ring includes a further hetero atom, e.g., the morpholine ring.

In preferred dyestuffs of Formula I, X represents a divalent radical which makes up the nitrogen-containing ring A into an azole ring condensed with carbocyclic-aromatic rings, and most preferably a benzazole ring.

In particularly preferred dyestuffs of the above formula, X represents a divalent o-phenylimino radical, i.e., X makes up the nitrogen-containing ring A into a benzimidazole ring. This ring is bound to the coumarin imide radical in the 3-position and is unsubstituted or is further substituted as described above.

Preferably $R_1$ and $R_2$ are identical and each represents an alkyl group of 1 to 6 carbon atoms, but most preferably the methyl or ethyl group.

Dye compositions according to the invention comprise the above-described dyestuffs of Formula I in sufficient amounts to achieve a desired colour depth when disperse-dyeing hydrophobic synthetic organic fibres therewith. In practice, not more than about 80% by weight of the composition, and preferably not more than 60% consists of such dyestuff while the balance consists of about 5 to 85% and preferably 10 to 75% of dispersing agents which form protective layers about the dyestuff particles and prevent their agglomeration but usually do not strongly reduce the surface tension of liquid media in which the dyestuff is to be dispersed, and optionally diluting agent (coupage) and other suitable adjuvants which are compatible with the dyestuffs and with the purpose of using such preparations in dyebaths and printing inks.

Among these adjuvants, there are especially wetting agents which assist the dispersion of the particles of the dye composition in, for instance, aqueous dye liquors or inks, due to their strong surface tension-reducing action. Such wetting agents are present in the novel dye compositions in amounts of 0.1 to 10% and preferably 0.5 to 5%, calculated on the total weight of the compositions. Other adjuvants that may be present are moisture-retaining agents and thickeners used especially when the dye compositions according to the invention are to be given pasty consistency, and in the latter case, also bactericidal or fungicidal adjuvants.

Care should be taken that the pH of the dye compositions to be stored does not exceed about 7, because at higher pH the stability of the dye composition may be adversely affected.

Preferably, the dyestuff content in the dye compositions according to the invention should not exceed 60% by weight, since at higher concentrations the compositions cannot be used directly for the preparation of dye liquors, causing over-dyeing which means that not all dyestuff is properly drawn on the fibres and excess dyestuff causes loss of fluorescence of the resulting dyeings. Dye compositions having dyestuff contents higher than 60% must, therefore, first be diluted before actual use in disperse dyeing of hydrophobic organic fibre material.

It is advantageous to bring the dyestuffs according to the invention into a finely distributed form by milling with the aforesaid dispersing agents and other adjuvants. The dyestuffs according to the invention are preferably milled with such dispersing agents with the addition of water and grinding assistants such as glass beads. The resultant aqueous dyestuff pastes which contain the dyestuffs in finely distributed form can be used direct for dyeing or can be converted into nondusty powders by careful drying by known methods.

One compound falling under Formula I has been mentioned as occurring as a hitherto unisolated intermediate product for the production of the coumarin compounds heterocyclically substituted in the 3-position which are described in German Pat. No. 1,098,125. They are preferably produced by aldol condensation and subsequent coumarin cyclisation of a 2-hydroxy-4-amino-benzaldehyde of Formula II

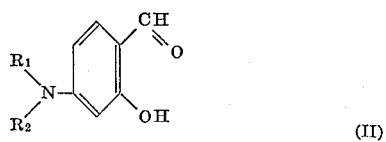

with a cyanomethyl compound of Formula III

In these formulae, $R_1$, $R_2$ X and A have the meanings given above. Examples of the aldehyde component of Formula II are 4-amino-, 4-dimethylamino-, 4-diethylamino-, 4-ethylamino-, 4-N-methyl-N-benzylamino-, 2-hydroxy-benzaldehyde, and nitrogen-containing heterocyclic compounds of Formula III are chiefly azoles, particularly azoles condensed with carbocyclic-aromatic rings, such as benzothiazole, benzimidazole and benzoxazole compounds containing the reactive cyanomethyl group.

The condensation of the aldehyde component of Formula II with the heterocyclic component of Formula III is advantageously performed in a polar organic solvent in the presence of inorganic or organic basic condensing agents and at temperatures of, preferably, 0 to 50° C. Alcohols, particularly low alkanols such as methanol or ethanol, cyclic ethers such as dioxane and, mainly, amides of low fatty acids such as formamide or dimethyl formamide, or dialkyl sulphoxides such as dimethyl sulphoxide are used, for example, as polar organic solvents.

Examples of basic condensing agents are alkali metal salts of carbonic acid such as sodium or potassium carbonate; alkali metal salts of low fatty acids such as sodium or potassium acetate or alkali metal alcoholates, particularly alkali metal alkanolates such as sodium or potassium methylate or ethylate, or also nitrogen bases, particularly cyclic organic nitrogen bases such as piperidine, hexamethylene imine, pyridine and, preferably, pyrrolidine.

Examples of synthetic fibre materials dyeable with the dye compositions according to the invention are: cellulose esters, chiefly cellulose acetates such as cellulose di-, 2½- and tri-acetate; polyesters, particularly polycondensation products of aromatic dicarboxylic acids with glycols such as polyethylene glycol terephthalates or isophthalates, or polyhexahydroxylyl diol terephthalates (e.g., "Dacron," "Terylene," "Kodel," and "Vycron"); synthetic polyamides, particularly polycondensation products of diamines and dicarboxylic acids, mainly saturated aliphatic dicarboxylic acids, such as polyhexamethylene adipinamide (Nylon 66) and polymerisation products of lactams such as poly-ω-caprolactams (Nylon 6) or polymerisation products of ω-aminocarboxylic acids such as poly-ω-amino undecanoic acid (Nylon 11); polyurethanes, in particular, polycondensation products of urea with nonamethylenediamine; and polymeric or copolymeric acrylonitrile of which the greater part consists, preferably, of up to 80 to 100% of polymeric acrylonitrile and up to 20 to 0% of copolymeric vinyl acetate or vinyl pyridine. These fibre materials can be in the form of, e.g., yarn, threads, flakes, slubbing, fabrics spun threads or films.

Certain cellulose esters such as cellulose di- and, chiefly, tri-acetate can also be dyed in the spinning mass as the coumarin imide dyestuffs usable according to the invention dissolve well in many organic solvents, e.g., in acetone.

Preferably, however, the dyeing and printing of the fibre material mentioned with the coumarin imide dyestuffs of the above formula is performed from aqueous dispersion. Dispersions of these coumarin imide dyestuffs are advantageously brought into a finely distributed form by milling with dispersing agents. Suitable dispersing agents are, e.g., anionic ones such as alkylaryl sulphonates, condensation products of formaldehyde with naphthalene sulphonic acids, or lignin sulphonates, or non-ionic dispersing agents such as fatty alcohol polyglycol ethers. Advantageously mixtures of the dispersing agents mentioned are used.

The synthetic fibre materials are dyed with the dyestuffs usable according to the invention from aqueous dispersion by the usual processes. Polyesters of aromatic dicarboxylic acids with glycols are advantageously dyed at temperatures of over 100° C. under pressure. Dyeing can also be performed, however, at the boiling point of the dyebath in the presence of carriers such as phenyl phenol, polychlorobenzene or similar auxiliaries, or also by the pad dyeing process followed by thermofixation at 180 to 210° C. Cellulose diacetate fibres are advantageously dyed at temperatures of 80 to 85° C. whilst cellulose tri-acetate fibres and synthetic polyamide fibre material is dyed with advantage at the boiling point of the dyebath. The use of carriers is not necessary for the dyeing of the last type of fibres mentioned. Dyeing of polymeric or copolymeric acrylonitrile is performed from an acid, preferably acetic acid bath at the boiling temperature.

The materials mentioned are printed by the usual methods. For example, the substrate is printed with an aqueous printing paste of dyestuffs usable according to the invention and the print is then steamed between about 90 to 110° C. or thermofixed at between about 120 and 140° C.

The dispersing and wetting agents and other adjuvants used in the compositions according to the invention should not form salts with the dyestuffs therein, since this would decrease the drawing power of the latter. Suitable non-salt-forming dispersing and wetting agents are listed below:

(A) Substances with weak surfactant and strong dispersing properties:

lignin sulphonate (sodium, potassium, ammonium salts, sulphite cellulose waste liquor).

(B) Substances with medium to strong surfactant and medium to strong dispersing properties:

(i) anionic aromatic sulphonic acids as well as their condensation products, especially with formaldehyde, and their salts, alkylarylsulphonates such as alkylbenzene and alkylnaphthalenesulphonate, formaldehyde-naphthalene-sulphonic acid condensation products, esters and condensation products of fatty alcohols and sulphonic acid, e.g., alkyl sulphates and alkyl sulphonates, hydroxy- and amino-substituted hydrocarbon sulphonic acids which are acylated by fatty acid radicals, as well as their salts, sulphonated benzimidazole derivatives, condensates of protein with fatty acids or with hydrocarbon-sulphonic acids, as well as organically substituted ammonium salts of the foregoing acids;

(ii) non-ionic surfactant ethylene oxide adducts of fatty alcohols and/or alkylphenols, fatty amines and/or alkylarylamines as well as fatty acid amides;

(iii) cationic surfactants quaternary ammonium salts derived from fatty amines or fatty amine polyglycol ethers.

(C) Substances with no or weak surfactant and medium dispersing, but also with good levelling properties:

higher polyamines and especially polyamine condensation products described, e.g., by Lindner in "Tenside, Textilhilfsmittel, Waschfohstoffe," vol., pages 970–976, published by Wissenschaftliche Verlagsgesellschaft, Stuttgart, Germany (1964), and quaternized polyamines described ibidem pages 983–987, furthermore, polyvinylpyrrolidone.

Whether the above-listed auxiliaries act more as dispersants or more as wetting agents or more as levelling agents depends in each case not only on the dyestuff but also on the fibre being dyed and on the combination of auxiliaries in the specific dyeing process applied.

Preferred as dispersing agents are alkali metal and ammonium lignin sulphonates and condensation products of naphthalene-sulphonic acids with formaldehyde, e.g., Belloid TD.

Preferred wetting agents with accompanying dispersant activity are polyoxyethylene stearates, condensate of nonylphenol and ethylene oxide, preferably in a molar ratio of 1:10 to 1:12, oleoylmethyl-tauride (sodium salt), alkali metal dodecylbenzene-sulphonates, alkali metal tetralin-sulphonates.

As diluting agents (coupage) there may be used urea, dextrin and the like, preferably nonelectrolytic substances.

As moisture-retaining agents in pastes and inks there are used glycerol, ethylene glycol, diethylene glycol, propylene glycol, sorbitol and the like aliphatic alcohols.

The following examples illustrate the invention. The temperatures are given therein in degrees centigrade. Percentages are given by weight unless expressly stated otherwise.

EXAMPLE 1

1 g. of the dyestuff of the formula

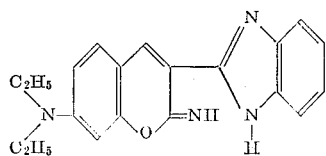

is finely milled with a mixture of 1 g. of lignin sulphonate and 1 g. of the sodium salt of a condensation product of naphthalene-2-sulphonic acid and formaldehyde (molar ratio about 2:1).

1 g. of the dyestuff preparation so obtained is dispersed in 4000 g. of water. 20 g. of sodium salt of o-phenyl phenol as carrier and 20 g. of diammonium sulphate are added to this dispersion and 100 g. of polyglycol terephthalate yarn are dyed therewith for 1½ hours at 95–98°. The dyebath is substantially exhausted. The dyeing is rinsed with water and then after-treated for 15 minutes at 80° in 4000 ml. of water with 12 g. of 30% sodium hydroxide solution and 4 g. of octylphenyl polyglycol ether. The dyed material is then again rinsed thoroughly with water and dried. In this way a greenish yellow dyeing of the greatest brilliancy is obtained which has excellent fastness to washing and sublimation and good fastness to light.

If, in this example, the 20 g. of sodium salt of o-phenyl phenol are replaced by 20 g. of one of the following commercial carrier preparations, e.g., by 20 g. of o-phenyl phenol emulsion in water, or 20 g. of p-chlorophenoxyethanol emulsion, or 20 g. of dichlorobenzene emulsion, or 20 g. of cresotinic acid methyl ester emulsion, or 20 g. of an emulsion of a mixture of 1 part of terephthalic acid methyl ester and 1 part of benzanilide, and otherwise the procedure described in this example is followed, then equally brilliant, fluorescent dyeing having the same fastness properties are obtained.

The dyestuff used above is produced by condensing 19.3 g. of 2-hydroxy-4-diethylamino-benzaldehyde and 15.7 g. of benzimidazole-2'-yl-acetonitrile in 200 g. of dimethyl formamide in the presence of 10 g. of pyrrolidine and 1 g. of acetic acid at room temperature. The reaction product precipitates in crystalline form and, after stirring for 24 hours at 25–30°, is isolated by filtration.

EXAMPLE 2

0.5 g. of the dyestuff of the formula

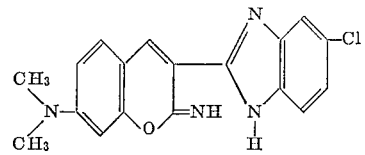

is finely suspended in a pressure dyeing apparatus in 2000 ml. of water which contains 4 g. of oleyl polyglycol ether, 4 g. of the sodium salt of a condensation product of naphthalene-2-sulphonic acid and formaldehyde, and 10 g. of diammonium sulphate. The pH of the dyebath is adjusted to 6 to 6.5 by the addition of acetic acid.

100 g. of tightly rolled polyglycol terephthalate fabric are introduced at 50°, the bath is heated in an autoclave within 30 minutes to 130° and the fabric is dyed for 50 minutes at this temperature. The dyebath is well exhausted. The dyeing is then washed with water, soaped, again rinsed with water and dried. In this way a greenish yellow dyeing of greatest brilliancy and which is fast to washing, perspiration, light and sublimation is obtained.

The dyestuff of the above formula used in this example is produced by condensation of 16.5 g. of 2-hydroxy-4-dimethylamino-benzaldehyde and 19.1 g. of 5'-chlorobenzimidazol-2'-yl-acetonitrile in 200 ml. of dimethyl sulphoxide in the presence of 20 g. of piperidine and 2 g. of acetic acid for 24 hours at room temperature.

Under the same conditions, the dyestuffs listed in the following Table I produce dyeings having similar good properties on polyglycol terephthalate fibres.

TABLE I

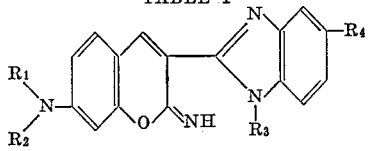

| Example No. | $R_1$ | $R_2$ | $R_3$ | $R_4$ | Shade on polyglycol terephthalate fibres |
|---|---|---|---|---|---|
| 3 | $-C_4H_9$ | $-C_4H_9$ | H | $-CH_3$ | Greenish yellow. |
| 4 | $-C_2H_5$ | $-C_2H_5$ | H | $-SO_2CH_3$ | Do. |
| 5 | $-CH_3$ | $-CH_3$ | $-CH_3$ | $-SO_2C_2H_5$ | Do. |
| 6 | $-C_2H_5$ | $-C_2H_5$ | $-CH_3$ | $-COOC_2H_5$ | Do. |
| 7 | $-C_2H_5$ | $-C_2H_5$ | $-CH_3$ | $-OCH_3$ | Do. |
| 8 | $-C_2H_5$ | $-C_2H_5$ | $-CH_3$ | $-OC_2H_5$ | Do. |
| 9 | $-C_2H_5$ | $-C_2H_5$ | $-C_2H_5$ | H | Do. |
| 10 | $-CH_2-\langle C_6H_5 \rangle$ | $-CH_3$ | H | Br | Do. |
| 11 | $-C_5H_{11}$ | H | H | H | Do. |
| 12 | $-C_2H_5$ | $-C_2H_5$ | $-C_2H_4CN$ | H | Do. |
| 13 | $-CH_2CH_2-CN$ | $-CH_3$ | H | H | Do. |
| 14 | $-CH_2CH_2-OH$ | $-CH_3$ | H | H | Do. |
| 15 | $-CH_2CH_2-OH$ | $-C_2H_5$ | H | $-CH_3$ | Do. |
| 16 | $-C_3H_7$ | H | H | H | Do. |
| 17 | H | H | $-CH_3$ | H | Do. |
| 18 | $-CH_2CH_2-Cl$ | $-CH_3$ | H | H | Do. |
| 19 | $-CH_3$ | $-CH_3$ | H | $-COOCH_2-\langle C_6H_5 \rangle$ | Do. |
| 20 | $-CH_3$ | $-CH_3$ | H | $-OC_2H_5$ | Do. |
| 21 | $-C_2H_5$ | $-C_2H_5$ | $-C_3H_7$ | H | Do. |
| 22 | $-CH_3$ | $-CH_3$ | H | $-C_3H_7$ | Do. |
| 23 | $-CH_3$ | $-CH_3$ | H | $-C_2H_5$ | Do. |
| 24 | $-C_3H_7$ | $-C_3H_7$ | H | $-CF_3$ | Do. |
| 25 | $-CH_3$ | $-CH_3$ | H | $-COOCH_3$ | Do. |
| 26 | $-CH_3$ | $-CH_3$ | H | $-COOC_2H_5$ | Do. |
| 27 | $-C_2H_5$ | $-C_2H_5$ | H | $-COOCH_3$ | Do. |
| 28 | $-CH_3$ | $-CH_3$ | H | $-CONH_2$ | Do. |
| 29 | $-CH_3$ | $-CH_3$ | H | $-CONHCH_3$ | Do. |
| 30 | $-CH_3$ | $-CH_3$ | H | $-NH-COCH_3$ | Do. |
| 31 | $-CH_3$ | $-CH_3$ | H | $-NH-SO_2-CH_3$ | Do. |
| 32 | $-CH_3$ | $-CH_3$ | H | $-CO-N(CH_3)_2$ | Do. |

EXAMPLE 33

If, instead of the coumarin imide derivative described in Example 1, the dyestuff of the formula

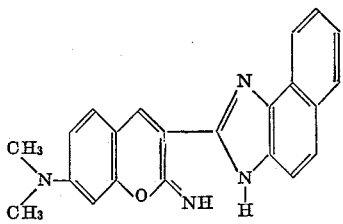

is used and otherwise the procedure given in Example 1 is followed, then a greenish yellow dyeing is also obtained which has similar properties.

The dyestuff of the above formula is obtained by condensing, at 30°, 16.5 g. of 2-hydroxy-4-dimethylamino-benzaldehyde and 20.9 g. of (naphtho-1″,2″:4′,5′)-imidazol-2′-yl-acetonitrile in abs. ethanol in the presence of 20 g. of sodium ethylate.

EXAMPLE 34

Polyglycol terephthalate fabric (e.g., Dacron, E. I. Du Pont de Nemours, Wilmington, Del., U.S.A.) is pad dyed in a foulard at 40° with a liquor of the composition given below:

|  | G. |
|---|---|
| The dyestuff described in Example 1, finely dispersed in | 10 |
| Sodium alginate | 7.5 |
| Triethanolamine | 20 |
| Octyl phenyl polyglycol ether | 20 |
| Water | 900 |

The fabric is squeezed out to a liquor content of about 100% and dried at 100°. The dyeing is then fixed for 30 seconds at a temperature of 200 to 210°. The dyed goods are rinsed with water, soaped and dried. In this way a very brilliant, greenish yellow dyeing is obtained which is fast to washing, rubbing, light and sublimation.

The dyestuffs used in the other examples produce dyeings of equal quality in this process.

Under otherwise the same conditions, a fluorescent, greenish yellow dyeing is obtained on the polyester part of a fabric made from 50% cotton and 50% polyglycol terephthalate whilst the cotton part remains well reserved.

EXAMPLE 35

2 g. of dyestuff of the formula

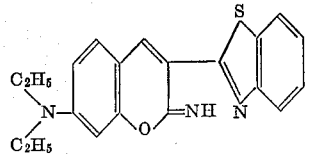

are dispersed in 4000 ml. of water.

100 g. of synthetic polyamide fabric (e.g., Nylon 6) are introduced at 70° and the temperature of the dyebath is arised within 30 minutes to 100°. The fabric is then dyed at the boil for 1 hour. It is rinsed with water, soaped, again rinsed thoroughly with water and dried.

In this way an extraordinarily brilliant greenish yellow dyeing is obtained.

The dyestuff of the above formula is produced by condensation at 30° of 19.3 g. of 2-hydroxy-4-diethylamino-benzaldehyde and 15.9 g. of benzothiazol-2′-yl acetonitrile in 200 g. of dimethyl formamide and in the presence of 10 g. of pyrrolidine and 10 g. of pyrrolidine acetate.

Dyeings having similar good fastness properties are obtained on synthetic polyamide and polyurethane fibres on using the dyestuffs given in the following Table II in otherwise the same procedure and incorporated in dye compositions according to the invention as illustrated in Examples 1, 2 and 34.

TABLE II

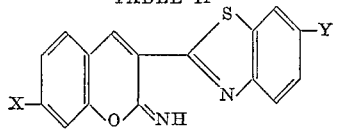

| Example No. | X | Y | Shade on synthetic polyamide fibres |
|---|---|---|---|
| 36 | $(CH_3)_2N-$ | $-CH_3$ | Greenish yellow. |
| 37 | $(C_2H_5)_2N-$ | $-OCH_3$ | Do. |
| 38 | $(CH_3)_2N-$ | Cl | Do. |
| 39 | $CN-CH_2-CH_2-NH-$ | H | Do. |
| 40 | $(CH_3)_2N-$ | $-NH-COCH_3$ | Do. |
| 41 | $(C_2H_5)_2N-$ | Br | Do. |
| 42 | $HO-CH_2-CH_2-N(CH_3)-$ | H | Do. |
| 43 | morpholino- | H | Do. |
| 44 | $C_6H_5-CH_2-N(CH_3)-$ | H | Do. |
| 45 | pyrrolidino- | H | Do. |
| 46 | piperidino- | H | Do. |
| 47 | $C_6H_{11}-NH-$ | H | Do. |
| 48 | $C_6H_{11}-CH_2-NH-$ | H | Do. |
| 49 | $(C_4H_9)_2N-$ | H | Do. |
| 50 | $Br-CH_2CH_2-NH-$ | H | Do. |
| 51 | $CH_3O-CH_2CH_2-NH-$ | H | Do. |

EXAMPLE 52

1 g. of dyestuff according to Example 2 and 8 g. of oleic acid-N-methyl tauride are finely dispersed in 4000 ml. of water. 100 g. of cellulose diacetate fabric are introduced into the bath at 40° and the temperature is then raised to 80° within 30 minutes. Dyeing of the fabric is performed for 1½ hours at this temperature.

The dyed material is well rinsed with warm and cold water and dried. In this way a brilliant, greenish yellow dyeing which has good wet fastness properties is obtained.

EXAMPLE 53

1 g. of dyestuff according to Example 1 and 8 g. of oleic acid-N-methyl tauride are finely dispersed in 4000 ml. of water. 100 g. of cellulose triacetate fabric are introduced at 60° and the bath temperature is raised within 30 minutes to 100°. The fabric is then dyed at the boil for 1½ hours. The dyeing is rinsed and then treated for 15 minutes at 60–70° with a solution of 4 g. of a fatty acid sulphonate in 4000 ml. of water. The dyed goods are then again well rinsed with water and dried.

The yellow dyeing obtained is distinguished by brilliancy and good fastness to wet, light and sublimation.

Similar, somewhat more red dyeings are obtained on using 2-(pyridin-2'-yl)-7-diethylamino coumarin imide or 3-(quinolin-2'-yl)-7-diethylamino coumarin imide.

The first substance mentioned can be obtained by reacting, at 25–30°, 11.8 g. of 2-cyanomethyl pyridine (described in Winterfeld and Flick, Archiv der Pharmazie, 289./61, vol. 1965 No. 8, p. 450) and 19.3 g. of 2-hydroxy-4-diethylamino benzaldehyde in 100 ml. of ethanol and in the presence of 2 g. of pyridine; the latter substance mentioned is obtained in an analogous manner on using 16.8 g. of 2-cyanomethyl quinoline instead of 11.8 g. of 2-cyanomethyl pyridine.

EXAMPLE 54

Polyglycol terephthalate fabric is printed on a printing machine at 25° with a printing paste of the following composition:

|   |   |
|---|---|
|   | G. |
| Dyestuff according to Example 1, finely dispersed in 300 g. of water | 30 |
| Urea | 40 |
| Crystal gum thickener | 400 |
| 10% aqueous o-phenyl phenol emulsion | 200 |

The printed fabric is steamed for 1 hour at 100°, then soaped, rinsed with water and dried.

In this way a brilliant, greenish yellow print is obtained which is distinguished by good fastness to washing, rubbing, light and sublimation.

A print having similar good properties is obtained, if, in the above example, the 200 g. of 10% o-phenyl phenol emulsion is replaced by 200 g. of water and the printed fabric is steamed for 30 minutes under excess pressure of 1.5 atm. or is fixed for 1 minute in a hot airstream at a temperature of 210°.

On being used on polyglycol terephthalate fabrics, the dyestuffs described in the other examples produce prints of similar quality by this method.

EXAMPLE 55

1 g. of dyestuff of the formula

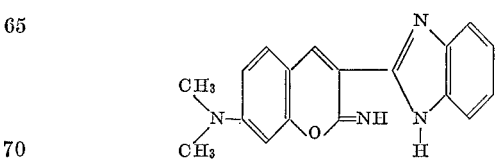

is finely dispersed in 4000 ml. of water which contains 8 g. of oleic acid-N-methyl tauride. 100 g. of polyamide fabric (e.g., Nylon 66) are introduced into the bath of 70° and the temperature of the bath is raised within 30 minutes to 100°. The fabric is then dyed at the boil for 1 hour after which it is rinsed with water, soaped, again rinsed with water and dried.

The intensively yellow-green fluorescent dyeing is distinguished by its good wet and light fastness.

EXAMPLE 56

1 g. of the dyestuff preparation described in paragraph 1 of Example 1 is finely dispersed in 4000 ml. of water in the presence of 20 g. of acetic acid and 25 g. of sodium acetate. 100 g. of a fabric made from polyacrylonitrile fibres which fibres have a polymerisation number of about 35,000 and possess, per 100 g. thereof, about 46 millimols of sulphonic acid groups and about 17 millimols of carboxyl groups as dyesites (e.g., Orlon), are dyed in this dyebath during 1½ hours at 95–98°. The dyebath is substantially exhausted. The dyeing is rinsed with water, soaped, again rinsed thoroughly and dried.

A greenish yellow, very brilliant dyeing is obtained which has excellent fastness to washing and good light fastness.

EXAMPLE 57

100 g. of the dyestuff made in Example 55 are mixed by grinding for 48 hours with 20 g. of lignin sulphonate and 250 g. of water, and about 500 g. of glass beads having a diameter of 2 millimeters each. The resulting slurry is separated from the glass beads by sieving, and the slurry is homogenised by strong stirring while adding a further 80 g. of lignin sulphonate, 25 g. of glycerol and 5 g. of benzoic acid as bactericide.

The resulting dye composition can be stored and can be used in the same way as described in the preceding examples.

A similar good dye composition is obtained by adding to the dyestuff in the above example, during the grinding of the latter with 20 g. of lignin sulphonate, also 10 g. of dioctyl ester of sulpho-succinic acid (Alrowet D-65) as wetting agent.

We claim:
1. A dye composition comprising
   (a) a water dispersible dyestuff free from water-solubilizing groups which dissociate acid in water, which dyestuff is of the formula:

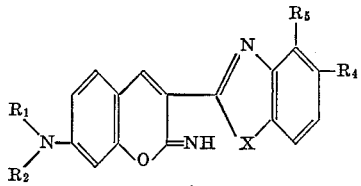

wherein $R_1$ represents a member selected from the group consisting of hydrogen, alkyl having from 1 to 6 carbon atoms, β-halogenoethyl, β-cyanoethyl, β-hydroxyethyl, β-methoxyethyl, cyclohexyl and benzyl;

$R_2$ represents a member selected from the group consisting of hydrogen and alkyl having from 1 to 4 carbon atoms; or $R_1$ and $R_2$ together form a morpholine, pyrrolidine or piperidine ring;

X represents S or N—$R_3$ wherein $R_3$ is a member selected from the group consisting of hydrogen, alkyl having 1 to 3 carbon atoms and β-cyanoethyl;

$R_4$ represents a member selected from the group consisting of hydrogen, halogen, lower alkyl, trifluoromethyl, loweralkoxy, lower alkyl sulphonyl, lower alkoxycarbonyl, benzyloxycarbonyl, carbamoyl, N-lower alkyl carbamoyl, N,N-di-lower alkylcarbamoyl, lower alkanoylamino lower alkyl sulphonylamino;

$R_5$ represents hydrogen or $R_4$ and $R_5$ together with the benzene ring to which they are attached form a naphthalene nucleus; and
   (b) an anionic or nonionic dispersing agent compatible with said dyestuff.

2. A dye composition as defined in claim 1, wherein said dyestuff is of the formula

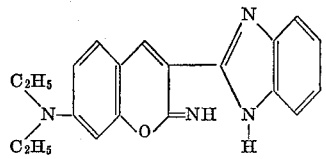

3. A dye composition as defined in claim 1, wherein said dyestuff is of the formula

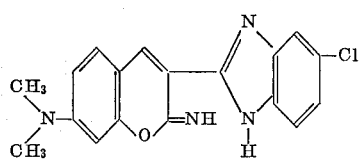

4. A dye composition as defined in claim 1, wherein said dyestuff is of the formula

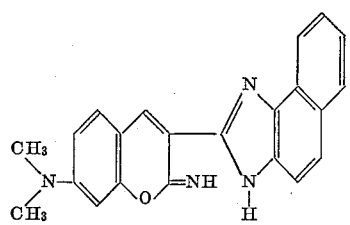

5. A dye composition as defined in claim 1, wherein said dyestuff is of the formula

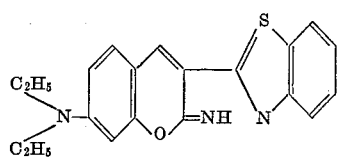

6. A dye composition as defined in claim 1, wherein said dyestuff is of the formula

7. A method for coloring synthetic fiber by dyeing or printing, which comprises applying to said material water-dispersible dyestuff free from water-solubilizing groups which dissociate acid in water, said dyestuff being of the formula:

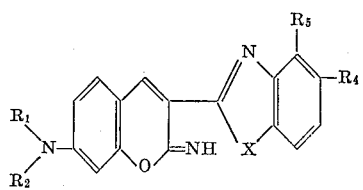

wherein $R_1$ represents a member selected from the group consisting of hydrogen, alkyl having from 1 to 6 carbon atoms, β-halogenoethyl, β-cyanoethyl, β-hydroxyethyl, β-methoxyethyl, cyclohexyl and benzyl;

$R_2$ represents a member selected from the group consisting of hydrogen and alkyl having from 1 to 4 carbon atoms; or $R_1$ and $R_2$ together form a morpholine, pyrrolidine or piperidine ring;

X represents S or N—$R_3$ wherein $R_3$ is a member selected from the group consisting of hydrogen, alkyl having 1 to 3 carbon atoms and β-cyanoethyl;

$R_4$ represents a member selected from the group consisting of hydrogen, halogen, lower alkyl, trifluoromethyl, loweralkoxy, lower alkyl sulphonyl, lower alkoxycarbonyl, benzyloxycarbonyl, carbamoyl, N-lower alkyl carbamoyl, N,N-di-lower alkylcarbamoyl, lower alkanoylamino lower alkyl sulphonylamino;

$R_5$ represents hydrogen or $R_4$ and $R_5$ together with the benzene ring to which they are attached form a naphthalene nucleus.

8. A method as described in claim 7, wherein said material is dyed from an aqueous dispersion of said dyestuff.

9. A method as described in claim 7, wherein said material consists essentially of polyester fibres.

10. A method as described in claim 7, wherein said material consists essentially of fibres of polyester of aromatic dicarboxylic acid.

11. A method as described in claim 7, wherein said material consists essentially of fibres of polyethylene glycol terephthalate.

12. A method as described in claim 7, wherein said material consists essentially of cellulose ester fibres.

13. A method as described in claim 7, wherein said material consists essentially of cellulose triacetate fibres.

14. A method as described in claim 7, wherein said material consists essentially of cellulose 2½-acetate fibres.

15. A method as described in claim 7, wherein said material consists essentially of synthetic polyamide fibres.

16. A method as described in claim 7, wherein said material consists essentially of Nylon 6 fibres.

17. A method as described in claim 7, wherein said material consists essentially of Nylon 66 fibres.

18. A method as described in claim 7, wherein said material consists essentially of acrylic fibres.

19. Synthetic fiber containing a coloring amount of dyestuff free from water-solubilizing groups which dissociate acid in water, said dyestuff being of the formula:

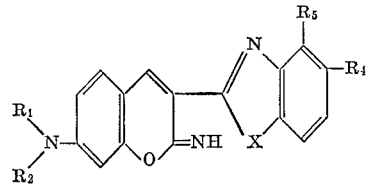

wherein $R_1$ represents a member selected from the group consisting of hydrogen, alkyl having from 1 to 6 carbon atoms, β-halogenoethyl, β-cyanoethyl, β-hydroxyethyl, β-methoxyethyl, cyclohexyl and benzyl;

$R_2$ represents a member selected from the group consisting of hydrogen and alkyl having from 1 to 4 carbon atoms; or $R_1$ and $R_2$ together form a morpholine, pyrrolidine or piperidine ring;

X represents S or N—$R_3$ wherein $R_3$ is a member selected from the group consisting of hydrogen, alkyl having 1 to 3 carbon atoms and β-cyanoethyl;

$R_4$ represents a member selected from the group consisting of hydrogen, halogen, lower alkyl, trifluoromethyl, loweralkoxy, lower alkyl sulphonyl, lower alkoxycarbonyl, benzyloxycarbonyl, carbamoyl, N-lower alkyl carbamoyl, N,N-di - lower alkylcarbamoyl, lower alkanoylamino lower alkyl sulphonylamino;

$R_5$ represents hydrogen or $R_4$ and $R_5$ together with the benzene ring to which they are attached form a naphthalene nucleus.

References Cited

UNITED STATES PATENTS 3,014,041   12/1961   Hausermann et al. ____ 260—304

FOREIGN PATENTS 1,098,125   7/1961   Germany.
372,307   11/1963   Switzerland.

DONALD LEVY, Primary Examiner

U.S. Cl. X.R.

8—162, 169, 171, 172, 177, 178